Nov. 28, 1944.                W. H. CARRIER                2,363,945
                         AIR CONDITIONING SYSTEM
                 Original Filed Aug. 12, 1939    5 Sheets-Sheet 1

INVENTOR.
                                           Willis H. Carrier
                              BY
                                           Herman Reid Nov. 28, 1944.　　　　W. H. CARRIER　　　　2,363,945
AIR CONDITIONING SYSTEM
Original Filed Aug. 12, 1939　　5 Sheets-Sheet 2
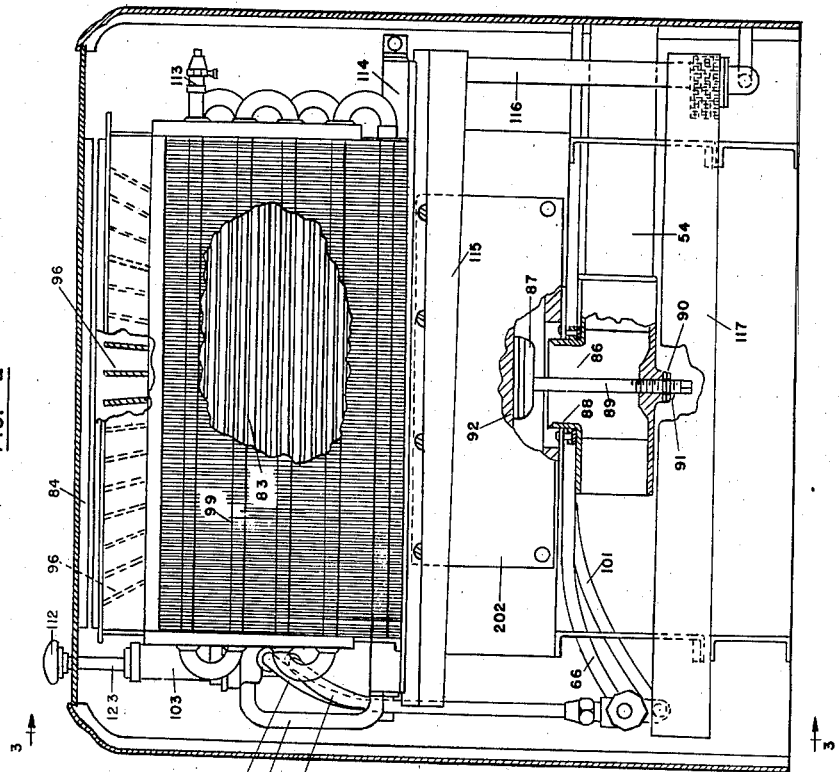
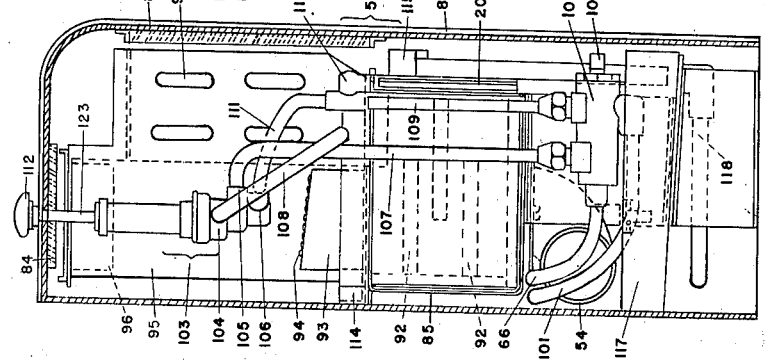
INVENTOR.
Willis H. Carrier
BY Nov. 28, 1944.  W. H. CARRIER  2,363,945
AIR CONDITIONING SYSTEM
Original Filed Aug. 12, 1939   5 Sheets-Sheet 3

INVENTOR.
Willis H. Carrier
BY Herman Reid

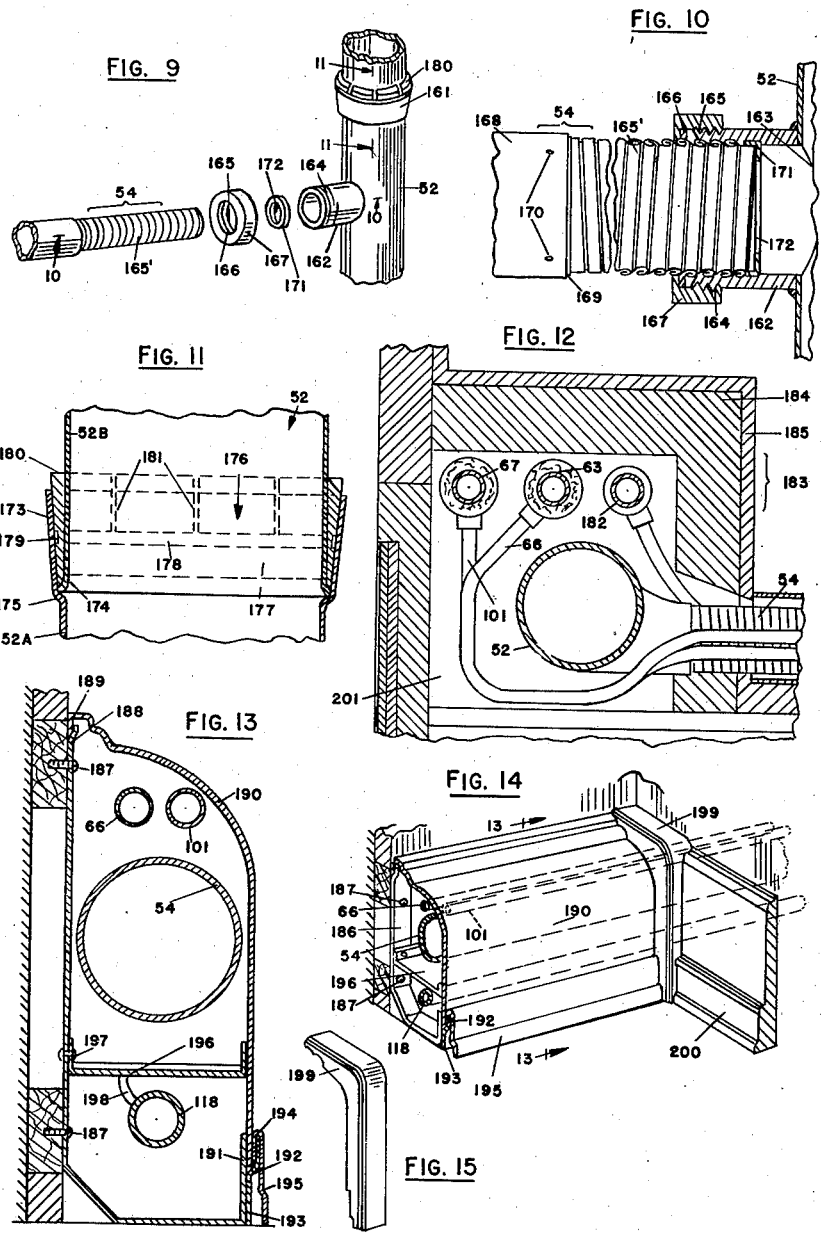

Nov. 28, 1944.     W. H. CARRIER     2,363,945
AIR CONDITIONING SYSTEM
Original Filed Aug. 12, 1939     5 Sheets-Sheet 5

INVENTOR.
Willis H. Carrier
BY

Patented Nov. 28, 1944

2,363,945

UNITED STATES PATENT OFFICE 2,363,945

AIR CONDITIONING SYSTEM

Willis H. Carrier, Syracuse, N. Y., assignor to Carrier Corporation, Syracuse, N. Y., a corporation of Delaware Original application August 12, 1939, Serial No. 289,749. Divided and this application July 7, 1942, Serial No. 450,054

8 Claims. (Cl. 257—3)

This invention relates to air conditioning and is a division of application Serial No. 289,749 filed August 12, 1939.

The general object of the invention is to provide improvements in conditioning of air for rooms of office buildings, schools, hospitals, apartments, hotels and the like.

It is an object of the invention to provide required cooling under summer operating conditions and required heating under winter operating conditions, while at all times maintaining a desired dewpoint or atmospheric moisture content within a plurality of conditioned enclosures.

It is another object of the invention to provide improved accessories for producing desired conditioning during winter and summer seasons, and also, during intermediate seasons, whereby different enclosures may simultaneously be heated and cooled whenever such differential action is required by load conditions affecting the several enclosures served by the system.

It is another object of the invention to provide an improved air conditioning system which assures positive and adequate ventilation at all times of the area or enclosures served thereby.

It is another object of the invention to provide an air conditioning system employing a plurality of local units severally disposed in or proximate the areas which are to be served by said units, said units containing no motors, compressors, fans or other apparatus of a similar nature, and being entirely free of moving parts, thus giving assurance of long life, silent operation and freedom from operating difficulties and mechanical break-downs.

It is another object of the invention to provide an air conditioning system which is particularly well adapted for installation in existing structures at relatively low cost, and which also is well adapted for installation in new structures.

It is another object of the invention to provide an air conditioning system for conditioning a plurality of areas or enclosures in which a portion of the air delivered to said areas or enclosures is conditioned at a central point, but in which the distribution of such air is effected without resort to conventional ducts of large sizes, the air conditioned at the central point in accordance with the present invention being supplied through conduits of relatively small dimensions and occupying relatively little space. In office buildings and the like, where space is at a premium and rentals are based on the floor area available for useful purposes, the saving of space effected by the present invention is of great importance.

It is another object of the invention to provide an improved air conditioning system for conditioning a plurality of enclosures in which a portion of the required conditioning is effected at a central conditioning point remote from the enclosures and the remainder of the required conditioning is effected by apparatus of the unit type disposed in and serving the various enclosures conditioned by the system.

Broadly stated, the invention includes conditioning to a desired degree a first volume of air at a central conditioning point, and distributing this air at relatively high static pressure and at relatively high velocity to a plurality of units respectively disposed in and serving a plurality of areas or enclosures to be conditioned. The high pressure air supplied to each unit is discharged therein through nozzle formations or the like, and in this manner induces a relatively great secondary circulation of air withdrawn from the area served by the unit. The primary or high pressure air and the secondary or induced air are then supplied to the conditioned area. Preferably, the primary air is conditioned to a predetermined dewpoint at the central conditioning point, and tempering means, such as coils or the like, are disposed in the various local units to effect sensible cooling or heating of air circulated through the unit as required. The primary air preferably comprises outdoor air, and since in carrying out the invention it is preferred to use approximately one part of primary air for each four parts of secondary air supplied to each conditioned enclosure, adequate ventilation of the enclosures served by the system is thus assured.

These and other features, objects and advantages of the invention will more fully appear from the following description to be read in connection with the accompanying drawings, in which:

Fig. 2 is a front elevational view, partly in section, of one of the local units adapted to be employed in carrying out the invention;

Fig. 3 is a view of the unit of Fig. 2 taken on the line 3—3 thereof;

Fig. 9 is a fragmentary view, in perspective, of a riser employed in carrying out the invention, and a lateral connection thereto, the latter being shown in an exploded view;

Fig. 10 is a view in vertical section through an assembled lateral air connection, taken on the line 10—10 of Fig. 9;

Fig. 11 is a view on an enlarged scale, taken on the line 11—11 of Fig. 9, illustrating the joint formation in the vertical riser;

Fig. 12 is a view in horizontal section through one of the channels housing the air riser and water supply, return and drain pipes, which extend upwardly from the central station apparatus for connection with the various local units of the apparatus;

Fig. 13 is a view in vertical section of a baseboard construction adapted to contain and conceal the laterally extending air conduit, water supply, water return and drain pipes, taken on the line 13—13 of Fig. 14;

Fig. 14 is a view in perspective of the corner of an enclosure served by apparatus in accordance with the invention, illustrating the baseboard assembly;

Fig. 15 is a view in perspective, of a baseboard spacer element;

Figure 1:
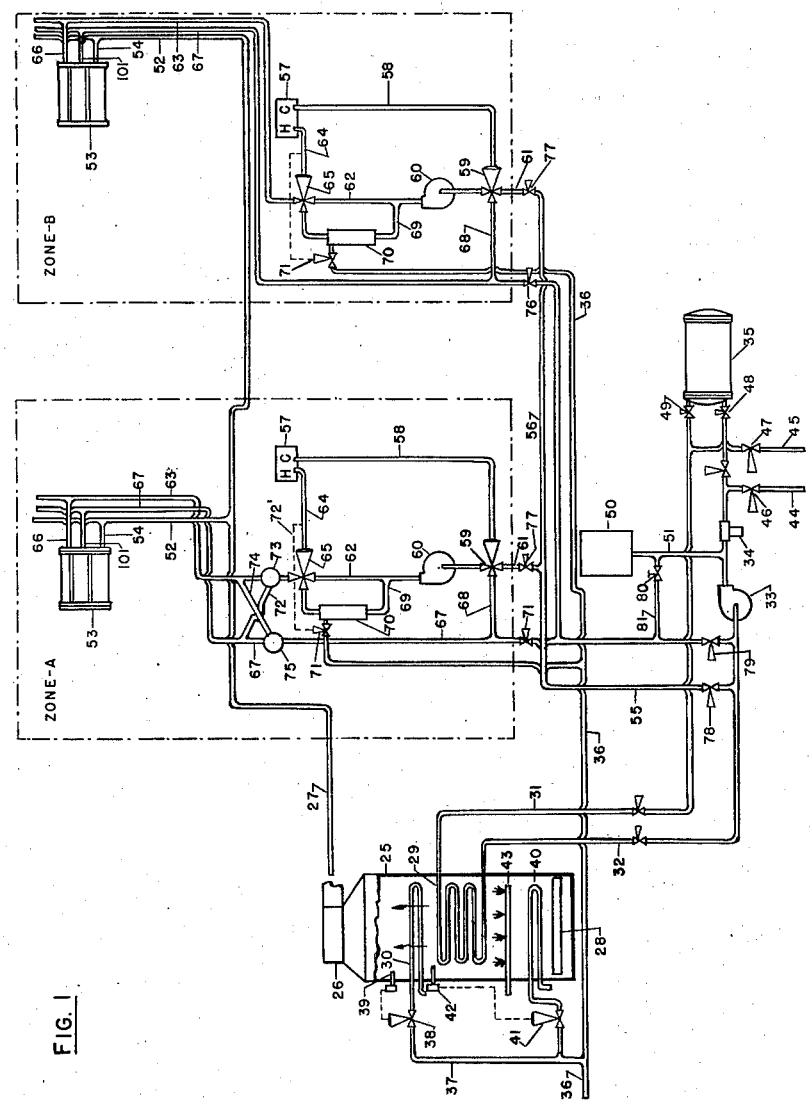
Fig. 1 is a diagrammatic view illustrating an air conditioning system embodying the invention.

Referring now to the drawings, similar numerals referring to the same or similar parts, the numeral 25 designates generally a casing containing air conditioning apparatus of any desired type, and disposed at any desired point in or proximate a building to be conditioned. Thus, for example, the casing 25 may be disposed in the cellar, attic or storage space of a building served thereby. A fan 26 draws air through the casing, preferably from the outdoor atmosphere, whereby the air is conditioned in desired manner during its passage through the casing 25, and then discharges this air at relatively high static pressure into the primary high pressure air main 27.

The conditioning apparatus in casing 25 may be of any desired type and it is to be understood that the invention is not limited with respect thereto. As illustrated, however, the conditioner casing 25 preferably includes a filter 28, a cooling coil 29 and a reheating coil 30. Cold brine or other suitable conditioning medium is supplied to the coil 29 through supply line 31 and is withdrawn therefrom through return line 32 under the influence of pump 33 which returns the liquid through strainer 34 to a cooler 35, of any desired type, from which the cooled refrigerant is returned to line 31. Any desired means may be used to regulate suitable the temperature of the cooled refrigerant. Reheating coil 30 receives a heating medium, such as steam, from supply main 36 through branch line 37 under the control of valve 38 controlled by thermostat 39. The valve 38 admits steam to the coil 30 in a quantity sufficient to maintain the temperature of the air leaving the casing 25 at a desired point, thus reducing the relative humidity of the air leaving the cooling coil 29. Preferably the conditioner casing 25 contains also a preheating coil 40 adapted to receive steam from main 36 under the control of valve 41 controlled by a thermostat 42 disposed within the conditioner casing, the preheating coil 40 being intended for use under winter operating conditions. The conditioner casing preferably also contains humidifying sprays or the like 43 operative under winter operating conditions to increase the moisture content of air passing through the conditioner casing.

The pipes 44 and 45, respectively connected to pipes 32 and 31, and respectively served by valves 46 and 47, may be used for connecting into the circuit of the cooling coil 29 a connection to a source of well water, ice-water storage tank, or a cooling tower or the like for use when the wet bulb temperature of the outdoor air is sufficiently low to permit the use of evaporative cooling instead of the refrigeration normally supplied in any desired manner to the cooler 35. It will be understood that when the valves 46 and 47 are opened, the valves 48 and 49, respectively located in lines 32 and 31, will be closed.

Preferably a closed expansion tank 50 is connected by line 51 to the refrigerant return line 32, the closed expansion tank containing a quantity of compressible medium such as air and being employed at a low point in the liquid circulating system. It will be understood that if desired an open expansion tank may be used at a high level in the system in the same manner as employed, for example, in connection with hot water heating systems.

As noted above, control of the operation of the local units may be effected either manually or automatically. For purposes of illustration, the section of the system indicated within the dotted lines and designated zone A in Fig. 1 of the drawings, will be described with particular reference to automatic control, while the section of the system indicated within the dotted lines and designated zone B, will be described with particular reference to manual control. It is to be understood that each zone of the conditioning system may comprise any number of local condition units, and that any number of zones may be provided.

For purposes of simplifying control, it is preferable that the zones of the system be arranged in accordance with the heat loads affecting the different enclosures of the conditioned building. For example, in an office building all of the offices having windows facing in an easterly direction would be subject to the heating effect of the sun early in the day, whereas this heat load due to sun effect will fall off later in the day. All or a number of such offices might well be served, in accordance with the invention, by local units comprising a single zone. In the same way the offices having windows facing in a southerly direction are preferably served by units comprising another zone of the conditioning system, etc. Of course, other factors than sun effect may have dominating importance in this connection. Thus, if certain rooms are ordinarily occupied to a great degree, whereas other rooms are ordinarily occupied to a lesser degree, it might be desirable to arrange the zoning of the various units with reference to these factors so that desired simplicity and uniformity of control may readily be achieved. In such case units having a high heat load would form one zone and units having a low heat load would form another zone.

It is to be understood that the units comprising a zone of the system may be located on different floors, or on the same floor, or both, and that any number of units may be incorporated within a zone. The nature of the zone controls and the interconnection of the various units with the central station conditioning plant, will now be described in detail.

The air delivered by the fan 26 to the primary air distributing main 27 is at a relatively high static pressure, of the order of 5" of water. A portion of this air is diverted from the primary main 27 and passes to a vertical riser 52 of zone A and a corresponding riser 52' of zone B. Each vertical riser delivers air to a plurality of units designated generally as 53, through lateral connections 54. The primary air thus delivered to each unit serves to induce a relatively great circulation of secondary air and to promote desired circulation of air in the conditioned enclosures.

A pipe 55 connects with the cold water return line 32 and is adapted to deliver cold water or brine from said return line to cold water supply header 56, which, in turn, is adapted to supply this water to the different local units 53 of the various zones.

Each zone is provided with a control instrument, generally designated 57, which may be conveniently located at any desired point either within or without the enclosures of the zone served thereby. In practice it has been found expedient to position the control device 57 outside of the building, or in such manner that it is subject to outdoor atmospheric conditions. Preferably, the control instrument 57 comprises a device known as the Aerotherm, manufactured by Webster-Tallmadge & Co., Inc. Since this control device is well known in the art and does not, per se, form part of the invention, no detailed description thereof is deemed required here. It is to be understood, however, that the control device 57 preferably responds not only to air temperatures, but also to air velocity, wind direction, etc., so that the device controlling each zone may accurately reflect the need either for cooling or heating of the particular zone served thereby, and may at least approximately indicate the degree of heating or cooling which is required.

When the control device 57 serving zone A indicates a demand for cooling of the enclosures served by the local units 53 of zone A, control line 58 leading from the control device 57 serves to open the three-way or proportioning valve 59 so that the pump 60 draws cold water from the header 56 upwardly through pipe 61 and delivers this cold water through pipe 62 to the cold water riser 63. Under such operating conditions the control device 57, through control line 64, operates to adjust the proportioning valve 65 in such manner that flow from the pipe 62 to the pipe 63 is unimpeded. Thus, cold water may be delivered from the pipe 63 to each of the units 53 through lateral connections such as 66, and this water may then be returned through pipe 67 to the cold water return line 32 at the suction side of the pump 33. When the control device 57 reflects a demand for maximum cooling, the valve 59 will be adjusted so that the pump 60 draws water only from header 56, and in this case also all of the water returning from the local units through the pipe 67 will pass to the water return line 32. However, if the cooling load is less than maximum, the proportioning valve 59 will be adjusted to an intermediate position determined by the cooling load, in which the pump 60 will draw water not only through pipe 61 from the header 56, but also through bypass line 69 leading from the water return line 67. It will be understood that the control device 57, by varying the proportions of water drawn from the supply header 56, and from the return line 67, will effect a variation in the temperature of the water delivered to the units in accordance with variations in load requirements.

Under winter operating conditions, or whenever heating is required, as indicated by the control device 57, the proportioning valve 59 is so adjusted that the pump 60 draws water only through the bypass connection 68 from line 67. The water then delivered from the pump passes to the proportioning valve 65 through line 62 or line 69, or both, in varying proportions controlled by the valve 65 under control of device 57. The line 69 contains a heater 70 which receives steam from header 36 under the control of valve 71, the valve 71 preferably being controlled by the control device 57 as indicated by the dotted line 72 leading to the control line 64. The valve 71 is normally fully open whenever heating is required, the modulation of heating effect being accomplished by the routing of different portions of water through the heater 70 and through the pipe 62.

Under summer operating conditions the water discharged from the valve 65 passes to the units through line 63 and is returned therefrom through line 67. However, under winter operating conditions when automatic control of the local units 53 is employed, as in zone A, it is preferred to reverse the circulation. Thus, under winter operating conditions, hot water delivered from the proportioning valve 65 is routed through cross-over pipe 72 to pipe 67 by suitable adjustment of three-way valve 73, and water returning from the local units passes through pipe 63, thence through cross-over pipe 74 by suitable adjustment of three-way valve 75, and then returns to the inlet of pump 60 through line 68.

Suitable shut-off valves 76 and 77 are provided for isolating the entire piping arrangement of each zone from the central conditioning apparatus if this should be desired.

Under winter operating conditions when no cooling is required, the circulation through the cooling coil 29 of the central station conditioner 25 is interrupted and in such case the shut-off valves 78 and 79 are closed to isolate the central station water circulating system from the water circulating system of the various zones. However, under winter operating conditions, or whenever the central station water circulating system is inoperative, the valve 80 in line 81 is opened to make available to the water circulating systems of the various zones the function of the expansion tank 50. When the central station water circulating system is operative and is operatively connected with the water circulating systems of the various zones, valve 80 is closed.

The piping and control arrangement for zone B, in which the units are controlled manually, is substantially as described in connection with zone A, except that it will be noted that valves 73 and 75, and the cross-over pipes 72 and 74, are omitted. In all other respects, the piping arrangement and basic control scheme is the same as described in connection with zone A, and therefore no detailed description is deemed required with respect to zone B.

Figure 4:
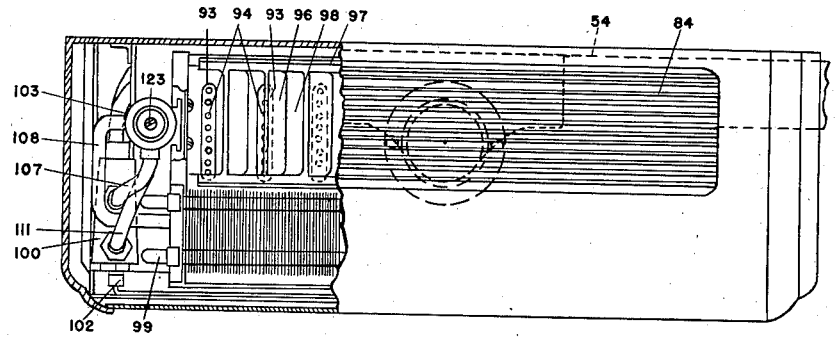
Fig. 4 is a view in plan of the unit of Figs. 2 and 3, part of the casing being broken away to show the interior of the unit.

Referring more particularly to Figs. 2, 3 and 4, illustrating one of the local units adapted to be employed, the numeral 82 designates generally a cabinet having an air inlet grille 83 formed in the front upper portion thereof and extending across a major portion of the length of the casing. Also an air outlet grille 84, comprising a plurality of vanes or louvres extending lengthwise of the casing, is provided in the top of the casing 82. Formed within the central portion of the casing 82 is an air plenum chamber 85 to which air is delivered through inlet 86 from lateral connection 54 extending from one of the vertical high pressure air risers. A valve closure member 87, operating in conjunction with valve seat 88, serves to control the volume of air admitted within the plenum chamber 85 and to effect the desired degree of pressure reduction. The valve closure member 87 is adjusted by means of a valve stem 89 preferably threaded and secured in desired position by a pair of lock nuts 90 which are tightened after the bottom projecting portion 91 of the valve stem has been turned to provide the desired degree of valve opening. In operation, once the valve has been adjusted to provide the desired static pressure within the plenum chamber, it remains fixed in position. However, if it is desired for any reason to cut the unit out of service, the valve is closed so that no air will be discharged through such unit, while the system is used for delivering high pressure air to other of the units continuing in active service.

Preferably, the interior of the plenum chamber 85 is provided with a plurality of sound absorbing baffles 92 constructed of any suitable sound absorbing material, which cause the air delivered to the plenum chamber to flow in a circuitous path to the top of the plenum chamber.

The top of the plenum chamber is provided with a plurality of extension chambers 93 extending crosswise of the unit and spaced from each other as best seen in Figs. 3 and 4. The tops of the chambers 93 preferably slope downwardly toward the front of the unit. Each chamber 93 is provided, at its upper extremity, with a plurality of spaced relatively small nozzles or orifices 94, $\frac{3}{16}''$ in diameter or smaller, through which air is discharged upwardly at relatively high velocity. In accordance with principles which are well understood, the high velocity discharge of air through the nozzles 94 induces a relatively great circulation of air intaken within the unit through the inlet grille 83, the air discharged at high velocity and the induced air mixing in a mixing chamber 95 and then being discharged from the unit through the outlet grille 84. The induction of air within the unit and its discharge therefrom insure active circulation in the enclosure served thereby.

To prevent drafts or "spilling" of cool air in the vicinity of the unit, there are provided a plurality of diffusion vanes 96 proximate the discharge outlet 84, and these are preferably arranged in a fan-shaped manner at varying angles, as best seen in Fig. 2. The diffusion of air lengthwise of the unit by the vanes 96 serves effectively to insure equable conditions within the enclosure without danger of drafts caused either by "spilling" or by impingement of the air stream against a relatively low ceiling or beam and resultant downward deflection. When the unit is employed in the center of a wall area the vanes are symmetrically arranged as shown in Fig. 2, but if the unit is employed at the end of a wall area it may be preferred to have the vanes which are closest the end wall vertical and the other vanes correspondingly inclined, the vanes farthest from the end wall most closely approaching the horizontal. While the vanes 96 may be formed in any desired manner, they are preferably punched from a solid plate 97, the resultant apertures 98 serving as air passages.

Within the casing 82 at the inside of the inlet grille 83 is disposed a suitable heat exchange means of any desired type for conditioning the air induced within the unit by the discharge of primary air from the nozzles 94. Preferably, the heat exchanger comprises coil 99 provided with suitable plate or spiral fins for increasing the efficiency of heat transfer. It is to be understood that if desired, the coil may be placed in the path of the primary air, as well as in the path of the induced air.

In Figs. 2, 3 and 4 the piping and control arrangement shown is that employed when the unit 53 is controlled manually. Water supply line 66 extends within the unit from vertical riser 63 and passes to a shut-off valve 100. Water return connection 101 returns to pipe 67 from valve 100. The valve 100 is a twin valve which serves to interrupt flow through both the supply line 66 and return line 101 by means of a single adjustment of the valve stem 102.

The numeral 103 designates generally a control valve, the construction and operating mechanism of which are described more fully hereinafter. For present purposes, however, it is sufficient to understand that the valve is provided with three connections—an upper connection 104, a center connection 105 and a bottom connection 106. A water supply line 107, constituting a continuation of the supply line 66, delivers water to central connection 105 of the valve 103. Some of this water thus delivered to the valve is discharged from the valve through pipe 108 and thus is delivered to the heat exchange coil 99. The water leaving the coil is returned to return pipe 109 through a connection indicated at 110. Water which is not supplied to the heat exchange coil 99 after supply to the valve 103, is bypassed from the valve back to the return pipe 109 through bypass return pipe 111, leading from valve opening 106. By regulation of the valve 103 by means of handle 112, varying proportions of the water delivered to the valve may be routed through coil 99 and through the bypass connection 111. In any event, however, regardless of the adjustment of valve 103, water is supplied to each unit through the supply pipe 66 and returned therefrom through the return connection 101 at a constant rate. Thus, the friction losses are maintained constant and the system therefore may be hydrostatically balanced to give results superior to those obtainable where the rate of flow to and from a unit is varied in accordance with load requirements. This latter operation may be employed if desired but it is to be understood that the operation described above, in which the system remains balanced at all times, is preferable.

Preferably, the coil 99 is provided with an air vent or the like 113 at the upper portion thereof to relieve air from the system.

In the operation of the central station conditioning apparatus, the primary air is reduced to a low dewpoint. When water or brine is used for this purpose in the manner illustrated in Fig. 1, the heat exchange surface is so designed that the brine returning from the coil 29 is at a higher temperature than the air leaving the conditioner casing 25. Since it is the brine from return line 32 which is supplied to the local units 53 to effect cooling thereat, it will be appreciated that the brine delivered to the local units will generally always be above the dewpoint of the air in the conditioned enclosures so that no moisture will be condensed in the local units. This is true in all cases except on starting up of the system in a humid atmosphere or where there is a relatively high latent heat load in the conditioned enclosure tending abnormally to increase the moisture content of the air therein.

To accommodate the water which from time to time may be precipitated by the coil 99 there is provided a drain pan 114 adapted to catch any water dripping therefrom. The front portion of the drain pan 114 discharges the collected moisture into a trough 115 which slopes downwardly toward the right hand side of the casing, as best seen in Fig. 2. From the low point of the trough 115 a drain connection 116 conveys condensate downwardly to an auxiliary condensate pan 117 which is disposed beneath all of the apparatus in the casing 82 to catch any condensate which may drip therefrom. The bottom of the pan 117 slopes downwardly toward the front of the unit and a drain connection 118 conveys water therefrom for disposition in any suitable manner. Preferably, the drain pipes extend from the various local units to a suitable point of condensate disposal in the manner indicated, for example, in Fig. 12. Thus, it is to be understood that the piping arrangement of Fig. 1 actually might also include the common drain pipes used for the various units. However, this feature has not been shown in Fig. 1 as it would tend unnecessarily to complicate the showing of the invention made therein.

Figure 5:
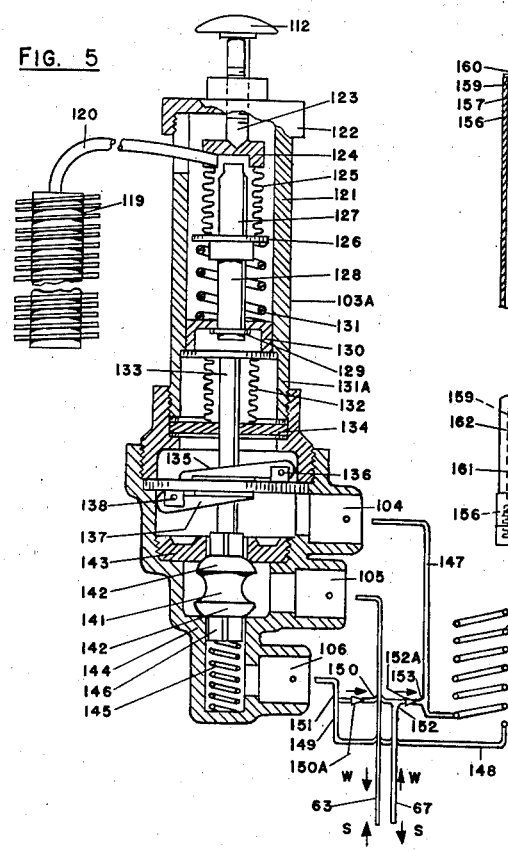
Fig. 5 is a view illustrating, in section, a valve adapted to modulate the cooling or heating action of the local units in response to changes in load requirements, and diagrammatically illustrates the piping connections to and between this control valve and the heat exchange coil of the conditioned unit.

Referring more particularly to Fig. 5, the numeral 103a designates a valve capable of automatically modulating the heating or cooling effect of the coil 99 of the local unit 53. The control element which is preferably used in conjunction with the valve comprises a length of finned tubing 119 of the type commonly used in the construction of heat exchangers. The length of the control element may approximate 8" and the diameter of the tube may be of the order of ½". One end of the tube is sealed and the other end connects with a pressure tube 120 which extends within the housing 121 of the valve 103a. The control element 119 is filled with a volatile fluid adapted to expand and contract with changes in temperature, such as ether, and the control element 119 is placed within the casing 82 behind the air inlet grille 83 and in the path of air intaken within the unit through said grille, so that the control element reflects the temperature within the enclosure served by the unit. The control element is preferably shielded in any desired manner from the heating or cooling effect of the coil 99 so as to insure more accurate control.

Through the top cap 122 of the valve there extends adjustable rod 123 bearing against a flanged disc or the like 124. The rod 123 is provided with a control handle 112 for use in adjusting the setting of the valve.

The flange 124 is secured in a gas-tight manner to the upper extremity of an expansible bellows 125, the lower extremity of the bellows being secured in a fluid-tight manner to a disc 126. The pressure tube 120 leads from the interior of the thermal element 119 to the interior of the bellows 125 so that as the temperature affecting the control element 119 is varied, the bellows 125 is caused correspondingly to expand and contract. A stud 127 extends within the interior of the bellows to decrease the free volume in the bellows, as this insures a more prompt and sensitive operation of the valve. The disc 126 is connected to a rod 128 extending downwardly therefrom and bearing a flange 129 at its lower extremity. The rod 128 extends within a cup-shaped member 130 and the flange 129 provides for retention of the rod 128 within the member 130 so that as the rod 128 is raised the member 130 will be raised correspondingly. A spring 131, extending between the bottom of disc 126 and the top of member 130, tends to maintain maximum separation of these two elements. The lower portion of member 130 carries a disc 131a to which there is connected, in a fluid-tight manner, a sealing bellows 132, and also a rod 133 extending through a plate 134 to which the bellows 132 is connected. Thus, the operating fluid of the thermal element is prevented from escaping within the valve and also the water or brine controlled by the valve is effectively prevented from escaping within the valve.

The rod 133 bears downwardly upon a lever 135 pivoted at 136. The free end of the lever 135 bears downwardly upon a lever 137, pivoted at 138, at a point proximate the fulcrum 138. The lever 137 is adapted to actuate the valve stem 139 which is operably connected through a star-shaped guide 140 to a valve closure member 141, comprising a pair of oppositely arranged faces 142. The arrangement of levers 135 and 137 is employed for the purpose of multiplying the motion of the primary control rod. Thus for a given movement of the valve rod 133 the corresponding movement of valve rod 139 may be four or five times as great. This amplification makes for increased sensitivity and refinement of control and makes it possible to maintain within very close limits the desired temperature in the conditioned enclosure.

The valve seat serving the upper face 142 is formed in a partition plate 143 provided between the upper connection 104 and the center connection 105 of the valve. The seat 144, cooperating with the lower face 142 of the valve member 141, is disposed between the central connection 105 and the bottom connection 106 of the valve. Spring 145, operating on valve guide 145, biases the valve in an upward direction.

Under summer operating conditions, or whenever cooling is required, a temperature higher than that desired required an increased flow of cooling medium through the valve. Under winter operating conditions, however, a temperature higher than normal calls for a decreased rate of flow of heating medium through the coil. To render the local unit entirely automatic so that its single valve may provide for the accurate control of temperature under both summer and winter operating conditions, the flow of conditioning fluid to and from the local unit is reversed as explained above in connection with three-way valves 73 and 75 and cross-over connections 72 and 74.

Fig. 5, in addition to illustrating the structure of the valve, discloses diagrammatically the piping arrangement at the local unit which is employed in the case of automatic operation.

Under summer operating conditions, as explained in connection with Fig. 1, cooling medium is supplied through line 63, and thus enters the valve through the central connection 105. Assuming a demand for cooling to exist, the high temperature affecting the control element 119 will cause depression of the valve 141 and thus some of the liquid entering the valve at connection 105 will flow upwardly and out of the valve through 104 and through line 147 to the heat exchange coil 99. The conditioning medium passing from the coil is routed through line 148 to junction 149 and then passes through pipe 150, containing check valve 150a, to line 67 and is thus returned from the local unit. The portion of the conditioning medium supplied to the valve which is not so routed, passes downwardly in the valve past the valve seat 144 and is discharged through connection 106 to line 151 through which it passes to junction 149, where this fluid is joined with the fluid discharged from the conditioning coil 99 and is returned therewith to the line 67. As more conditioning is required under summer operating conditions, more cold liquid is circulated through the conditioning coil 99 and less is bypassed through 106, and as less conditioning is required less cold liquid will be supplied to the coil 99 and more will be bypassed through 106.

Under winter operating conditions reverse operation occurs, and in this case an increased temperature affecting the thermal control element 119 results in decreased supply of conditioning medium, which is then at a relatively high temperature, to the conditioning coil. Under winter operating conditions, conditioning medium is supplied through line 67 and passes through the branch line 152 containing check valve 152a, to junction 153. Part of the conditioning medium travels through the pipe 147 and enters the valve at connection 104 and passes downwardly therein and is discharged from the valve through connection 105. The other portion of the conditioning fluid passes from the junction 153 to the conditioning coil 99, is discharged therefrom through line 148 and through connection 151, and enters the valve at 106 and is discharged therefrom through central opening 105 together with the fluid which was bypassed through connection 147. As the temperature affecting the thermal control element 119 rises, the valve 141 will be lowered and hence more of the conditioning fluid will be bypassed from 104 to 105, and correspondingly less of the conditioning fluid will pass through the coil 99 and the lower portion of the valve from 106 to 105. Conversely, if the temperature is lower than desired, more of the heating fluid will be routed through the conditioning coil and a lesser quantity will be bypassed.

When the valve controlling the action of the heat exchange coil 99 is controlled manually, there is no necessity for reversing the flow of the conditioning medium through the pipes 63 and 67 as in the case of automatic control in the manner just described, since an operator can readily turn the valve in either direction as required to bring about the desired change in the conditioning action. Thus, under summer operating conditions, when the local unit is supplied with cooling medium, if the temperature in the enclosure served by the unit is too high the operator will depress the valve 141 so as to permit increased flow of cooling medium from opening 105 to opening 104 serving the pipe 108, which delivers conditioning medium to the coil 99; and if the temperature is too low the operator will adjust the valve to raise the valve member 141 so that a lesser quantity of cooling medium flows through the conditioning coil 99. Under winter operating conditions, when heating medium is supplied to the conditioning unit, the operation is merely reversed. Thus, when the temperature in the enclosure is too high, the operator will raise the valve 141 to diminish the supply of heating medium to the coil 99 through the pipe 108, and if the conditioned enclosure is too cold, the valve 141 will be depressed to permit a greater supply of conditioning medium to the coil 99 through the connection 108.

During intermediate seasons, however, certain operating difficulties tend to arise. Thus, under certain conditions some of the zones of a conditioned enclosure may require heating while others require cooling. Under such conditions the central station apparatus would be operative for supplying cooled and dehumidified primary air to all zones, but the local zone control device 57 might cut off the supply of cooling medium to a zone requiring heating and instead might turn on the steam to warm the water circulated to and through the local units of such zone. Under such circumstances an operator seeking manually to adjust the valve might have some difficulty in determining whether the unit was being supplied with hot or cold water. Thus, if the operator put his hand over the air outlet grille of a unit supplied with hot water, he might experience a sensation of cooling arising from the relatively low dewpoint of the air and its relatively high velocity, although the delivered air might actually be at a higher temperature than the air in the room. The sensation of cooling might lead the operator to believe that the unit was being supplied with cool water and, feeling too warm, he would naturally open the valve wider. If in fact the unit was being supplied with warm water, such increased opening of the valve would naturally aggravate his discomfort. Thus, there is indicated a need for a device which will positively indicate to the operator the direction in which the valve should be adjusted to produce a desired change, so that under both summer and winter operating conditions, and regardless of whether the unit is being supplied with warm water or cold water, the operator will at all times be enabled to make the required adjustment promptly and without experimentation.

Figure 6:
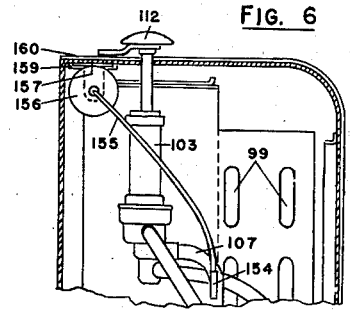
Fig. 6 is a fragmentary view in end elevation of the interior of a unit in accordance with the invention, illustrating an indicator mechanism adapted to be employed when control of the local unit is effected manually rather than automatically.
Figure 7:
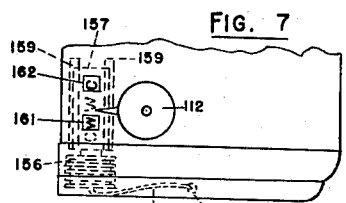
Fig. 7 is a view in plan of the control mechanism shown in Fig. 6.
Figure 8:
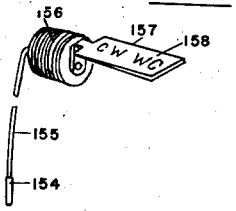
Fig. 8 is a view in perspective of a portion of the control mechanism of Figs. 6 and 7.

To this end there is preferably provided an arrangement such as illustrated in Figs. 6–8, which automatically indicates the direction in which the valve should be turned to provide for desired regulation of the room temperature, regardless of whether the unit is being supplied with hot water or cold water.

As illustrated, a thermal bulb 154 is placed in heat exchange relation with the water supply pipe 107. A pressure control line 155 leading from the thermal bulb 154 communicates with the interior of an expansible bellows 156. The expansible bellows 156 carries a slide plate 157 bearing suitable indicia indicated at 158. The slide plate 157 may be supported by suitable flanges or the like 159 and the plate 157 is mounted just beneath the top 160 of the conditioner casing, preferably at an end thereof. In the top of the conditioner casing are provided a plurality of apertures, one of these being designated 161 and the other 162. When the unit 53 is being supplied with cold water, the bellows 156 will be relatively contracted and the marking "W" or "Warmer" or the like may then be visible through the aperture 161 while the marking "C" of "Colder" or the like may be visible through the aperture 162. Thus, under summer operating conditions, or when cold water is being supplied to the unit, the operator will turn the valve handle 112 in a clockwise direction as seen in Fig. 7 to increase the cooling effect, and in a counter-clockwise direction as seen in Fig. 7 to decrease the cooling effect. Under winter operating conditions, or when heating medium is being supplied to the local unit 53, the bellows 156 will be caused to expand. This will move the slide 157 and the indicia visible through the apertures 160 and 162 will therefore be reversed. Therefore, if an operator under winter operating conditions feels too warm the valve handle 112 will then be turned in a counter-clockwise direction as seen in Fig. 7 to increase the conditioning effect, and if he feels too cool the valve handle will be turned in a clockwise direction as seen in Fig. 7. As will be understood, the valve handle is so arranged that adjustment of the handle in accordance with the position of slide 157 will effect the required adjustment of valve closure member 141.

It is to be understood that the adjustable indicator mechanism illustrated in Figs. 6–8 is employed only because the direction of flow of the conditioning medium is the same regardless of whether the conditioning medium is hot or cold. If desired, the cross-over pipes 72 and 74, and the three-way valves 73 and 75 described in connection with zone A of the system, may be incorporated in zones such as B in which the local units are manually controlled, and in such case there will be no need for providing the adjustable indicator mechanism of Figs. 6–8 which changes its position in accordance with the temperature of the conditioning medium. If the changeover arrangement is employed for reversing the flow in accordance with whether heating or cooling is being effected by the conditioning medium, an operator will always turn the valve in one direction if the enclosure served by the unit is too warm, and will always turn the valve in the opposite direction if the enclosure served by the unit is too cold.

It is to be understood, moreover, that while the valves 73 and 75 have been described as being three-way valves, the reversal of flow may be effected by the use of ordinary shut-off valves arranged in a manner well understood in the piping art. These change-over valves may be controlled manually but preferably are arranged automatically to change their position in accordance with the temperature of the conditioning medium made available for delivery to the local units of any zone, and as explained above, the temperature of the conditioning medium made available for supply to any particular zone is controlled in accordance with the particular requirements of that zone. Thus, cold water may be circulated through other of the zones. Since any well-known means may be used for effecting the adjustment of the change-over valves in response to changes in the temperature of conditioning medium made available for supply to the zones served thereby, no detailed showing of such control apparatus for the valves is deemed necessary here.

Referring now to Fig. 9, which illustrates a section of one of the high pressure air risers, and a portion of a lateral connection extending therefrom, the latter being shown in an exploded view, 52 designates the vertical riser which replaces, in the present invention, the relatively large and expensive distribution ducts of conventional air conditioning systems. The riser pipe 52 is of relatively small dimensions and comprises a tube of suitable metal or the like. It may comprise, for example, a welded tube of galvanized steel. While it is to be understood that the size of the riser 52 will vary in accordance with the requirements of particular installations, and the amount of air a particular section is required to handle, the diameter of the riser pipe will generally be of the order of about 6″. This is in marked contrast to the relatively large ducts required in conventional systems for distributing conditioned air from a central conditioning point to a plurality of remote enclosures served by the system. Thus, these conduits have an area of only about 7 to 10% of the area occupied by conventional ducts. Also, it will be appreciated that installation and assembly of risers comprising sections of pipe, such as 52, may be accomplished quickly and readily at relatively low cost. The vertical risers are assembled from separate sections which are joined together by suitable joints such as illustrated at 161, the preferred manner of joining the various sections of the riser 52 being shown more particularly in Fig. 11.

The exploded view portion of Fig. 8 and Fig. 10 illustrate a preferred method of connecting the lateral air connections 54 to the high pressure air risers. As illustrated, a pipe nipple 162 is welded to the riser pipe 52, the latter having a suitable opening 163 formed therein. The pipe nipple 162 is externally threaded, as indicated at 164, and is internally recessed so as to receive therewithin a flexible conduit 165′ of any desired construction. Preferably, the flexible conduit is of that type illustrated in Fig. 10 which is well known in the art. 165 designates a gasket of any suitable compressible material, preferably neoprene, and 166 designates a metal follower ring, preferably formed of brass or the like, which abuts the gasket and causes the latter to bear against the outer end of the pipe nipple 162. A screw cap 167 having an internally threaded cylindrical flange, engages the threads of the pipe 162 so as to take up on the follower ring and gasket. The other end of the flexible conduit 165′ is suitably secured to the laterally extending tube 168 which extends to the unit or units served by the lateral connection generally designated 54. Preferably, the flexible conduit is secured to the pipe 168 by being soldered thereto at 169 and by means of rivets or the like indicated at 170.

It is to be understood that the primary air within the risers 52 must at all times be at a static pressure which is sufficiently high so that notwithstanding friction losses and pressure drops throughout the system there may be a sufficient pressure available at the local unit most remote from the central station for providing the desired induction effect when the high pressure air is discharged within the local unit. Thus, it will be apparent that at intermediate local units the pressure in the riser pipe will be too high to provide the desired induction effect. Delivery of air within the unit at too high a pressure results in excessive velocity, noisy discharge, and an excessive rate of air circulation. Therefore, it is necessary to provide suitable means for reducing the pressure of the primary air which is delivered to the various local units.

In operation, the pressure in the primary air riser may be of the order of 4" of water, whereas the optimum pressure within the plenum chamber 85 of each local unit will preferably be of the order of about 1" of water. To accomplish the necessary reduction of pressure in a noiseless manner, the pressure is preferably reduced in stages. To this end there is provided an orifice ring 171 within the pipe nipple 162. The orifice ring 171 has a relatively small opening 172 formed therein, the size of the opening being determined in accordance with the amount of pressure reduction which is to be effected by the orifice ring. As will be understood, the smaller the opening the greater will be the pressure reduction. The additional or secondary stage of pressure reduction is accomplished by the valve 87 disposed at the air entrance 86 to the plenum chamber of each local unit. Reduction of the pressure in this manner assures simplicity in construction and quietness and efficacy in operation. Where there is a relatively small pressure differential between the pressure in the air main and the desired pressure in the plenum chamber of a local unit, and where the air valve at the unit may be depended upon to accomplish the required pressure reduction in a satisfactory manner, the orifice ring may be eliminated from the lateral connection serving such unit. This is often true in the case of units remote from the central conditioning apparatus.

Referring more particularly to Fig. 11 illustrating the manner in which the various sections of the riser 52 are assembled, the section 52a of the riser pipe 52 is belled at its upper extremity as indicated at 173, and the upper section 52b of the riser pipe 52 is disposed within the belled portion 173 of the lower section. The bottom extremity of the section 52b is preferably belled slightly outwardly as indicated at 174, the portion 174 abutting the shoulder 175 formed at the bottom of the belled portion 183. An air-tight and mechanically strong joint is assured by the provision of a wedging member generally designated 176 disposed between the belled portion 173 and the lower portion of the pipe section 52b. The inner surface of the wedging member 176 is cylindrical but the outside thereof is tapered to conform to the taper at the inside of the belled portion 173. The bottom portion 177 of the wedging member 176 is continuous, as is also the intermediate section 178 which is formed with a somewhat smaller outer diameter than the lower section 177 to provide a groove 179. The upper portion 180 of the wedging member 176 is provided with a plurality of vertically extending slits 181. By forcing the wedging member 176 tightly within the space between the belled portion 173 and the lower portion of section 52b, an air-tight and mechanically strong joint may be effected readily and quickly, without resort to solder or any other bonding or sealing material.

Fig. 12 is a horizontal section taken through a vertically extending assembly used for containing and concealing the riser pipe 52, the water circulation pipes 63 and 67, and a suitable drain pipe 182 communicating with the drain pipes 118 of the local units. All of the vertically extending pipes and conduits are contained within a suitable housing generally designated 183 which comprises a structural section 184 and an outer portion 185 of finishing plaster or the like. It will be noted that the connection pipes 66 and 101 of the water circulating system connecting with the water circulating riser 63 and 67 are looped around the air riser 52 so that the bends thus formed in these connecting pipes may provide for suitable expansion and contraction due to changes in temperature of the circulated conditioning medium. Preferably, the water circulating pipes are insulated in any suitable manner.

It will be understood that the vertical risers will not always be in immediate proximity to the local units, and it will therefore be required to run short lateral connections from the vertical riser and water pipes to the local units. In order that these laterally extending connections may be concealed from view, there is provided the baseboard arrangement illustrated in Figs. 13-15. As shown, a plurality of brackets 186 are secured to the wall of a room in any desired manner, as by screws 187. The upper extremities of the brackets 186 are provided with belled portions 188 behind which there is adapted to be positioned the downwardly extending flange 189 of a baseboard cover piece 190. The lower portion of the cover piece is received within a pocekt formed between an upwardly extending leg 191 of the bracket and a belled portion 192 of an upwardly extending member 193 suitably secured in any desired manner to the leg 191 of the bracket. Within the space thus formed there is also inserted the downwardly extending flange 194 of a base protecting plate 195 formed of suitable material adapted to withstand the corrosive action of cleaning agents which might come in contact therewith when the floors of the conditioned enclosure are cleaned. Mounted within the channel formed by the cover plate 190 is a drain trough 196 secured, as by screws 197, to the brackets 186. Over the drain pan 196 is positioned the laterally extending air connection 54 and the water connections 66 and 101. Thus, any moisture which might possibly be precipitated within the baseboard conduit is adapted to be caught by the drain pan 196, which may deliver the condensed moisture to drain pipe 118 as by means of a suitable connection 198. It will be appreciated that the cover piece of the baseboard assembly may be removed very readily to provide immediate access to the lateral air and water connections. Also, the baseboard assembly may be installed very quickly and conveniently and with the assurance that the assembly after completed will provide a finished and attractive appearance and will effectively conceal the lateral pipes connecting the unit with the vertical riser.

When it is necessary to extend the lateral connections to a wall or partition, this may be accomplished neatly by means of the finishing piece 199 illustrated in Figs. 14 and 15. The finishing piece may be used in conjunction with a conventional wood molding 200 so that the finished assembly will be entirely attractive as well as mechanically satisfactory.

If desired, a small quantity of the air conditioned in the central station conditioning apparatus may be discharged within the space 201 surrounding the vertically extending air risers and water connection and drain pipes. As will be understood, the air thus conditioned has a relatively low dewpoint and hence effectively prevents condensation upon the outer surfaces of the water supply or other pipes of the riser system. As pointed out above, the dewpoint of the air conditioned at the central station will generally be lower than the temperature of the water supplied to the local units for cooling purposes and this relationship practically precludes any possibility of condensation after normal operating conditions have been established. Condensation will tend to occur only when the system is placed in operation in a humid atmosphere or when there is an abnormal increase in the moisture content of the atmosphere surrounding the pipes of the riser system or in the conditioned enclosures.

Preferably, the front of the plenum chamber 85 of each local unit is provided with a removable plate 202 so that if, for any reason, access to the interior of the plenum chamber should become necessary, as for purposes of inspection, cleaning or repair, such access may be had conveniently.

Figure 16:
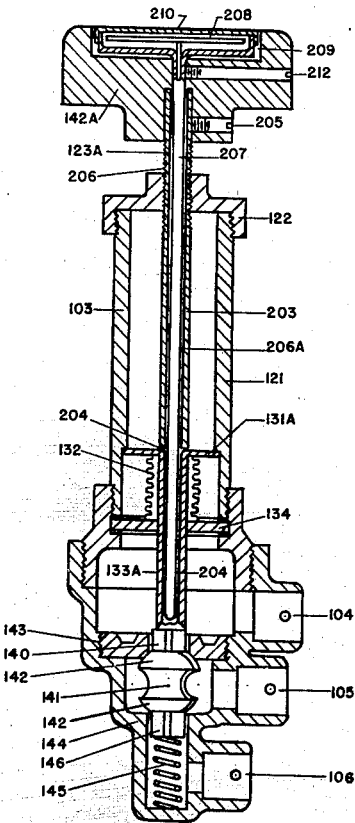
Fig. 16 is a view in vertical section through a manual control valve adapted to be employed in carrying out the invention, and incorporating a modified indicator mechanism in conjunction therewith.
Figure 17:
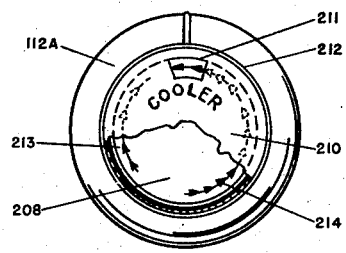
Fig. 17 is a view in plan of the control knob of the apparatus of Fig. 16.

Figs. 16 and 17 illustrate a valve construction adapted to be employed when manual control of the heating and cooling at the local units is desired. Such a valve is indicated at 103 in Figs. 2 and 3 and also in Fig. 6, except that the valve in Fig. 6 does not include the indicator mechanism disclosed in Fig. 16. The valve 103 is essentially the same as the valve illustrated in Fig. 5 except for the omission of the expansible bellows and the multiplying mechanism which become unnecessary and may be eliminated in the case of manual operation. Thus, the valve includes a casing 121, a top cap 122 and an actuating stem 123a, the valve stem 123a being hollow to provide a longitudinally extending channel 203 therewithin. The bottom of the rod 123a bears against an adjustably positioned plate 131a and is adapted to cause displacement of this plate. The plate 131a is connected to the partition plate 134 by a sealing bellows 132, as in Fig. 5. A rod 133a extends downwardly from the plate 131a and is movable therewith to actuate the valve closure member 141. The plate 131a is provided with a central opening 203 and the rod 133a is provided with a channel 204 extending therewithin and constituting an extension through the plate 131a of the channel 203 within the valve stem 123a. The handle 112a is secured to the valve stem 123a in any desired manner as by means of a set screw 205 so that as the handle is rotated, the valve stem is correspondingly rotated and raised or lowered by means of the threads 206 to provide the desired adjustment of position of the valve closure member 141.

Within the channels 203 and 204 there is positioned the stem 207 of a thermal indicator having a rotating disc 208 mounted at the top thereof and within a recess 209 formed in the top of the handle 112a. The recess is covered by a closure plate 210 which is provided with an aperture 211 through which a portion of the indicator plate 208 may be seen. A screw 212, or similar means, is employed to rotate the stem of the thermal indicator as the handle 112a is rotated so that the relative positions of the indicator disc 208 and the valve handle 112a may remain unaffected except by changes in temperature affecting the stem 207. Since thermal indicators of this type are well known in the art and in themselves do not constitute a part of the present invention, no detailed description thereof is deemed required here. One type of thermal indicator of the character indicated is manufactured by the Weston Electrical Instrument Company of Newark, New Jersey, the instruments manufactured by this company, however, being generally provided with a dial pointer rather than a disc as here disclosed. As will be understood, the thermoresponsive stem 207, extending within and through the body of the valve, will respond to changes in the temperature of the fluid passing through the valve and thus will change the position of the disc 208 in accordance with such changes in temperature. The upper face of disc 208 is provided with two sets of arrow indicators pointing in opposite directions and arranged throughout different arcuate portions of the indicator disc. When the conditioning medium circulated through the valve is cold, one portion of the indicator disc 208 will appear opposite the aperture 211, this portion bearing the arrows 213. The word "Cooler" appears upon the cover disc 210 proximate the aperture, and when the arrows 213 are visible through the aperture 211, this will indicate that to provide cooler conditions in the enclosure the valve handle should be turned in a clockwise direction. This will depress the valve closure member 141 and permit more conditioning medium to enter the pipe 128 and thus pass to the conditioner coils. If the room is too cool under such operating conditions the valve will be turned in a reverse direction to diminish the amount of cooling medium passing to the conditioning coil. When the conditioning medium supplied to the valve is warm another portion of the indicator disc 208 will appear through the aperture 211, the arrows 214 then indicating the direction in which the valve should be turned to provide a desired change in temperature within the enclosure. Thus, when heating medium is supplied to the valve, turning the valve in a counter-clockwise direction will render the enclosure cooler by raising the valve closure device 141 and diminishing the supply of heating medium to the conditioner coils, whereas, turning the valve handle in a reverse or clockwise direction will depress the valve closure member 141 and cause more heating medium to pass to the conditioner coils. It will be apparent to those skilled in the art, that instead of the word "Cooler" the word "Warmer" might be applied on the valve handle, in which case the arrows will each point in a direction opposite to that shown in the drawings, and that variations may be made in the physical embodiment of the invention without departing from the concept herein disclosed.

It will be observed that the system as above described is adapted readily to be installed in existing structures, particularly in those provided with the piping lines customary in steam heating and hot water installations, and that it is also well adapted to be installed in new structures. The installation of the system in either case is facilitated by the use of the high pressure piping for conveying the primary air at relatively high pressure and at a velocity which may be of the order of 3000–5000 feet per minute instead of the conventional ducts which occupy a vastly greater amount of space.

Because the number of local units in operation may vary from time to time, it may be desired to employ a static pressure regulator for maintaining a substantially constant pressure in the primary air means by throttling the supply of air to the mains from the primary fan, or varying the effectiveness of the fan by varying its speed, or by both methods in combination. Since static pressure regulators operating in this way are well known in the art and do not, per se, form part of the invention, although desirable for use in connection therewith when the number of units in operation is considerably varied from time to time, no detailed description thereof is deemed required here.

Since many changes may be made in the invention without departing from the scope thereof, it is intended that all matter set forth in the above description, or shown in the accompanying drawings, be regarded as illustrative only and not in a limiting sense.

I claim:

1. In combination, a valve having formed therein a first opening, a second opening, a third opening, means providing communication within said valve between said first opening and said second opening, means providing communication within said valve between said second opening and said third opening, throttling means adapted to control communication between said first opening and said second opening, other throttling means for controlling communication between said second opening and said third opening, said first mentioned and said other throttling means being arranged so that as communication between said first two openings is increased, communication between the last two openings is decreased and vice-versa, a first conduit connecting with said second opening of said valve, a heat exchange device, a second conduit providing communication between said first opening and the inlet to said heat exchange device, a third conduit providing communication between the outlet of said heat exchange device and said third opening, a cross-connection between said last mentioned conduit and said second conduit, a fifth conduit communicating with said cross-connection, and check valves in said cross section between the fifth conduit and the second and third conduits respectively whereby under summer operating conditions when cooling medium is supplied through said first conduit, increasing restriction of communication between said second and third openings will provide for increased flow of cooling medium through said heat exchange device and vice-versa, and whereby under winter operating conditions when heating medium is supplied through said fifth conduit, decreased communication between said second and third openings will result in a decreased rate of circulation of heating medium through said heat exchange device, said fifth conduit serving as a return connection under summer operating conditions when cooling medium is supplied through said first-mentioned conduit, and said first-mentioned conduit serving as a conditioning medium return under winter operation conditions when conditioning medium is supplied through said fifth conduit.

2. An apparatus of the character described including a plurality of air circulating and conditioning units, a common supply line adapted to deliver conditioning medium to said units, a common return line adapted to receive conditioning medium from said units after circulation therethrough, a source of conditioning medium, means for drawing conditioning medium from said source and from said common return line in varying proportions and for supplying the conditioning medium thus withdrawn to said common supply line at a substantially constant volumetric rate, means for withdrawing from said common return line the portion of conditioning medium which is not recirculated to said common supply line, whereby conditioning medium is circulated through said common supply line and through said common return line at a substantially constant and equal volumetric rate, and flow control means in combination with each of said units for modulating the flow of conditioning medium through the heat exchange device thereof to provide for modulation of the conditioning effect provided by each of said units.

3. An apparatus of the character described including a plurality of air circulating and conditioning units, a common supply line adapted to deliver conditioning medium to said units, a common return line adapted to receive conditioning medium from said units after circulation therethrough, a source of conditioning medium, means for drawing conditioning medium from said source and from said common return line in varying proportions and for supplying the conditioning medium thus withdrawn to said common supply line at a substantially constant volumetric rate, means for withdrawing from said common return line the portion of conditioning medium which is not recirculated to said common supply line, whereby conditioning medium is circulated through said common supply line and through said common return line at a substantially constant and equal volumetric rate, a branch supply line and a branch return line for each unit, and a valve means in combination with each of said units for modulating the flow of conditioning medium through the heat exchange device thereof to provide for modulation of the conditioning effect provided by said unit, and means associated with each unit for bypassing from the branch supply line of the unit to the branch return line thereof, a portion of the conditioning medium delivered to said branch supply line but prevented by said valve means from passing through said heat exchange device.

4. In combination, a plurality of air conditioning units, a fluid circuit for supplying conditioning medium to and returning conditioning medium from said units, said fluid circuit comprising a first common conduit serving said units, a second common conduit serving said units, and an impeller device, means for delivering conditioning medium discharged by said impeller to said units through said first common conduit under predetermined operating conditions, and for returning conditioning medium from said units through said second common conduit under said predetermined operating conditions, and means for delivering conditioning medium discharged from said impeller to said units through said second common conduit under other predetermined operating conditions, and for returning conditioning medium from said units through said first common conduit under said other predetermined operation conditions, whereby under said different operating conditions conditioning medium is circulated in different directions through said first and second common conduits.

5. In combination, a plurality of air conditioning units, a fluid circuit for supplying conditioning medium to and returning conditioning medium from said units, said fluid circuit comprising a first common conduit serving said units, a second common conduit serving said units, and an impeller device, means for delivering conditioning medium discharged by said impeller to said units through said first common conduit under predetermined operating conditions, and for returning conditioning medium from said units through said second common conduit under said predetermined operating conditions, and means for delivering conditioning medium discharged from said impeller to said units through said second common conduit under other predetermined operating conditions, and for returning conditioning medium from said units through said first common conduit under said other predetermined operating conditions, whereby under said different operating conditions conditioning medium is circulated in different directions through said first and second common conduits, auxiliary conduit means providing communication between each of said units and said first and second common conduits, a heat exchange device in each of said units, said auxiliary conduit means being arranged to supply to said heat exchange device conditioning medium received from one of said common conduits and also to bypass a portion of said conditioning medium around said heat exchange device, said conduit means being arranged to return both portions of said conditioning medium to the other common conduit, and proportioning valve means in combination with said auxiliary conduit means for variably proportioning the flow of conditioning medium at each unit through the heat exchange device thereof and bypassing the heat exchange device thereof, a thermo-responsive control element operatively connected with said proportioning valve means and adapted variably to control the flow of conditioning medium through and around the heat exchange device of said unit, said proportioning valve means being arranged whereby when conditioning medium is supplied through one of said common conduits, increased temperatures affecting said thermo-responsive device will cause said device to effect increased flow of conditioning medium through said heat exchange device and, vice-versa, decreased flow responsive to decreased temperature, and whereby under said other predetermined operating conditions when conditioning medium is supplied through the other of said common conduits, increased temperatures affecting said thermo-responsive control device will have the effect of causing said device to decrease the rate of flow of conditioning medium through said heat exchange device and decreased temperatures affecting said thermo-responsive control device will have the effect of increasing the rate of flow of conditioning medium therethrough.

6. An apparatus of the character described including, in combination, a plurality of air conditioning units each containing a heat exchange device, means forming a first fluid circuit including means for cooling conditioning medium circulated through said circuit, means for circulating air in heat exchange relation with said medium and delivering said air to the units means forming a second fluid circuit including said units, means for drawing conditioning medium from said first mentioned circuit and for circulating said withdrawn conditioning medium through said second circuit and the heat exchange devices of the units thereof in response to demand for cooling by said units, said last mentioned means including valve means and a thermo-responsive control device in control thereof, said valve means and the control device therefore serving to interrupt the withdrawal of conditioning medium from said first circuit whenever the load demand on said units for cooling falls below a predetermined point, and means for heating conditioning medium circulated through said second fluid circuit in response to load demands on said units requiring heating to be effected by said units.

7. An apparatus according to claim 6 in which said second circuit includes a first header serving said units and a second header serving said units, said first and second headers being adapted to supply conditioning medium to said units and to return conditioning medium therefrom, and including means for reversing the direction of fluid flow through said first and second headers.

8. In an apparatus of the character described, including a central conditioner and a plurality of local units each having a heat exchange device therein, a riser casing, a primary air conduit within said casing for supplying air from said conditioner to said units, a first conduit within said casing and a second conduit within said casing for respectively supplying conditioning medium to and returning conditioning medium from said units, means for circulating said medium through said central conditioner, means for conditioning primary air in said conditioner by circulating it in heat exchange relation with said medium, means for circulating said medium through said conduits subsequent to its employment for conditioning said primary air, and means for admitting within said casing a quantity of said primary conditioned air, said air having a dew point lower than the temperature of the conditioning medium in said conduits whereby the formation of condensation on the outer surfaces of said conduits is prevented.

WILLIS H. CARRIER.